THOMAS J. MAYALL.

Improvement in Machinery for Making India Rubber Flanged Tubing.

No. 125,599.    Patented April 9, 1872.

Witnesses.    Inventor.

UNITED STATES PATENT OFFICE.

THOMAS JEFFERSON MAYALL, OF BOSTON, MASSACHUSETTS.

IMPROVEMENT IN MACHINERY FOR MAKING INDIA-RUBBER FLANGED TUBING.

Specification forming part of Letters Patent No. 125,599, dated April 9, 1872.

*To whom it may concern:*

Be it known that I, THOMAS J. MAYALL, of Boston, in the county of Suffolk and State of Massachusetts, have invented certain new and useful Improvements in Machinery for the Manufacture of India-Rubber Flanged Tubing, of which the following is a specification:

My invention relates to machinery for the manufacture of vulcanized India-rubber tubing of a particular kind—viz., tubing, provided with a longitudinal flange upon its exterior, to be used for weather-strips, and for other purposes to which it may be adapted. The principal feature of the invention consists in the mode of uniting the flange with the body of the tube during the process of shaping or forming the latter, by means of a longitudinally-slit funnel or trumpet-shaped former, in which the tube is both formed and united with the flange. Other features of the invention relate to the means for guiding the flange-strip before it enters the funnel; to the combination, with said funnel, of drawing-rolls, by which both the flange-strip and the tube are properly drawn through and from the shaping-funnel; and to the combination, with two or more sets of drawing-rollers, of a slit guide-tube between each or any two adjoining sets, for the purpose of receiving and guiding the flanged tubing from one set of rolls to the other.

Figure 1:
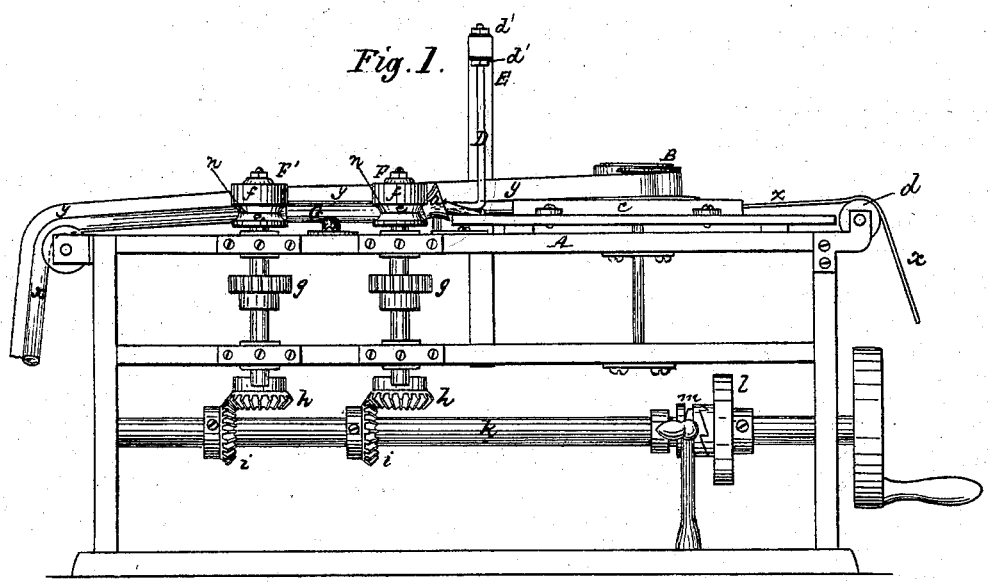
Figure 2:
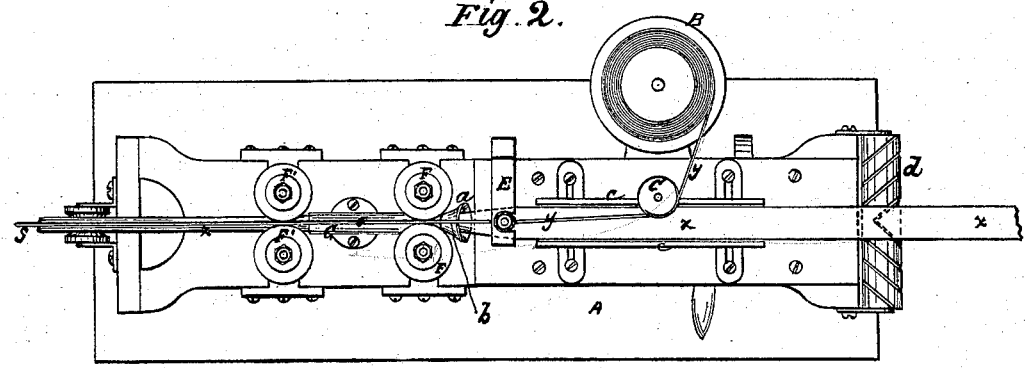

In the accompanying drawing, Figure 1 is a side elevation of a machine embodying my invention. Fig. 2 is a plan of the same.

The tubing proper is made from a flat strip, $x$, of green, vulcanizable rubber compound, of proper width and thickness, and of any length desired. The flange is formed from a strip, $y$, which is a fabric coated on both sides with rubber, and is usually narrower and considerably thinner than the strip from which the tube proper is made. To form the tube and unite with it the flange, I employ a funnel or hollow trumpet-shaped former, $a$, the open contracted end of which is made of a diameter equal to that which the tubing is to have. The other end of the funnel is of such size as to admit or receive the flat rubber strip $x$. In the progress of the strip $x$ from one end of the funnel to the other, its edges are, by the tapering form of the funnel, gradually bent over and toward each other until they meet and are pressed together. For the purpose of causing them to adhere to one another, they should be previously moistened with camphene or other solvent of rubber, or a rubber cement. This is usually effected by causing the edges of the strip, on the way from the reel to the funnel, to pass between and in contact with wicks or strips of cloth kept saturated with the camphene or other solvent or solution. To unite the flange-strip $y$ with the tubing, I form in the funnel a longitudinal slit at $b$, extending from end to end of the funnel, and so arranged that the flange-strip $y$, when inserted in said slit, will stand at about right angles over the center line of the rubber strip $x$, as shown in the drawing. The flange is inserted in the funnel to the proper depth, so that its lower part will be interposed between the bent over and contiguous edges of the rubber tubing during the process of the formation of the latter on the funnel. The edges of the strip $x$ thus do not directly meet, but are brought in contact and united with the interposed strip $y$, which not only constitutes the flange, but is also the means by which the two edges of the strip $x$ are held together. With a funnel of this kind, the flanged tubing can be made by drawing through it simultaneously both strips $x$ and $y$; and this may be accomplished by hand, or by any suitable means.

The drawing shows a simple arrangement of machinery for the purpose.

The funnel $a$ is supported upon a suitable table, A. The strip $x$ is fed to it between guides $c$, made adjustable by means of slots and set-screws, so that they may be placed nearer together or further apart, according to the width of the strip $x$. The strip passes over a divergingly-grooved roller, $d$, which serves to keep it properly spread out. The flange-strip $y$ passes from a reel, B, around a guide-roller, C, and through a slotted guide-rod, D, placed a little in advance of the point where the strip enters the slit in the funnel. This rod is supported in an overhanging standard, E, in a slot in the top of which it is held by means of upper and lower stop-nuts $d'$ $d'$, by which the rod may be adjusted up and down to determine the depth to which the strip shall extend down into the funnel. The slot in the standard is made open toward the front of the machine, as shown in Fig. 2, so that the guide-rod may be taken out from it when occasion demands. At the point where the tubing passes out from the funnel is a pair of drawing-rolls, F F, with concave grooves e, to receive the body of the tubing, and with plane surfaces, f, to take hold of the flange y, so that both tubing and flange may be drawn equally from the funnel. These rolls are geared together at g, and receive movement through bevel-gear h i, from a driving-shaft, k, which shaft is provided with a driving-pulley, l, and clutch, m, as usual. Each roll F is split or divided horizontally, at n, into two parts, so that washers may be interposed between the two whenever it is necessary to increase the size of the grooves e to receive tubing of larger diameter, and for the same purpose the shafts of the rollers are mounted in sliding boxes which may be adjusted at various distances from one another.

It is well to employ two or more sets of drawing-rolls, and I have shown two in the drawing the construction and arrangement of rolls F' F' being substantially similar to that of the rolls already described. Between the two sets of rolls I place a split tube, G, for the purpose of guiding the tubing from one pair of rolls to the other, the tube G being intended to receive the tubing, and the slit o to permit the passage of the flange y. The rolls not only draw along, but serve to complete the formation of the tubing and the union of the two strips. In practice, I cover them more or less with vulcanized rubber, to enable them to take a proper hold on the tubing.

With a machine of the kind described, several funnels of different gauges are employed, corresponding to the different sizes and diameters of tubing to be manufactured. The funnel a, therefore, is so arranged as to be detached from the table A, and I prefer, also, to arrange it so that it may be tilted, in order to depress more or less its contracted end, for the purpose of effecting the more complete union of the two strips.

After the tubing is made, it is vulcanized and finished in the usual way.

Having described my invention, what I claim, and desire to secure by Letters Patent, is—

1. A machine for making flanged India-rubber tubing, organized and operating substantially as herein described.

2. The manufacture of flanged India-rubber tubing, by drawing both the flange-strip and the strip from which the body of the tubing is made through a slit funnel or its equivalent, substantially as shown and described, whereby, at the same time, the tubing is both formed and united with its flange.

3. The combination, with the slit funnel, of the slotted adjustable guide through which the flange-strip is conducted to said funnel, substantially as shown and set forth.

4. In combination with the slit funnel, the revolving drawing-rolls, constructed substantially as shown and described, to take hold of or be in contact with both the body of the tubing and its flange.

5. In combination with the slit funnel and two or more sets of drawing-rolls, a slit guide-tube, arranged between each or any two sets of said rolls, to guide the tubing from one to the other set of rolls and permit the passage of the flange.

In testimony whereof I have signed my name to this specification before two subscribing witnesses.

THOS. J. MAYALL.

Witnesses:
A. POLLOK,
EDM. F. BROWN.